United States Patent
Wallace et al.

(10) Patent No.: US 10,592,860 B2
(45) Date of Patent: Mar. 17, 2020

(54) SYSTEM FOR SMART PANTRY MANAGEMENT USING CONSUMPTION DATA

(71) Applicant: Perfect Company, Inc., Vancouver, WA (US)

(72) Inventors: Michael Wayne Wallace, Vancouver, WA (US); Daniel Short, Camas, WA (US)

(73) Assignee: Perfect Company, Inc., Vancouver, WA (US)

( * ) Notice: Subject to any disclaimer, the term of this patent is extended or adjusted under 35 U.S.C. 154(b) by 0 days.

(21) Appl. No.: 15/828,015

(22) Filed: Nov. 30, 2017

(65) Prior Publication Data

US 2019/0164117 A1  May 30, 2019

(51) Int. Cl.
| G06Q 10/08 | (2012.01) |
| H04L 12/28 | (2006.01) |
| A47J 47/00 | (2006.01) |
| G06K 19/06 | (2006.01) |

(52) U.S. Cl.
CPC ............ *G06Q 10/087* (2013.01); *A47J 47/00* (2013.01); *H04L 12/2812* (2013.01); *H04L 12/2829* (2013.01); *G06K 2019/06253* (2013.01)

(58) Field of Classification Search
USPC ........................................................ 235/385
See application file for complete search history.

(56) References Cited

U.S. PATENT DOCUMENTS

2015/0290795 A1* 10/2015 Oleynik ................. G05B 19/42
                                                        700/257

* cited by examiner

*Primary Examiner* — Rafferty D Kelly

(57) ABSTRACT

A smart pantry system is able to build a data store of the food items that a user or household has on hand, and maintain the data store in light of corroborated point of consumption (POC) data. The data store may also include information about those food items, such as names of food items, brands of food items, number of units of food items, quantity of food items, expiration dates, dates that food items were purchased, nutrition information, etc. The system may also leverage the data store to provide recipe recommendations and/or notifications to a user.

16 Claims, 6 Drawing Sheets

DATA STORE 116

FOOD ITEM DATA 114

| Identifier | Type | Brand | Unit Size | Qty. | Amt. | Date Purchased | Expiration Date | ... |
|---|---|---|---|---|---|---|---|---|
| 0088267141676 | Almonds | Nut-vana | 2.0 oz. Tin | 1 | 1.3 oz. | 6/4/17 | 3/4/18 | ... |
| 0025092389026 | Bananas | --- | Individual | 7 | 7 | 6/22/17 | 6/26/17 | ... |
| 0063453252234 | Bell Pepper | --- | Individual | 2 | 1.5 | 6/22/17 | 7/6/17 | ... |
| 0035345222543 | Black Beans | Vegan Supply | 8 oz. Can | 5 | 40 oz. | 4/4/17 | 4/4/18 | ... |
| 0034536887730 | Butter | sMOOth | 1 Stick | 4 | 3.7 sticks | 6/4/17 | 7/4/17 | ... |
| 0028462211455 | Chocolate Chips | G.P. | 12 oz. Bag | 1 | 0.3 oz. | 6/4/17 | 10/4/17 | ... |
| 0034345635330 | Cocoa Power | G.P. | 6 oz. Tin | 1 | 4 oz. | 12/4/16 | 12/4/18 | ... |
| 0034535867730 | Cornmeal | Queen Cornmeal | 16 oz. Bag. | 2 | 39.5 oz. | 6/4/17 | 6/4/20 | ... |
| 0336588452736 | Cucumber | --- | Individual | 2 | 1.25 | 6/22/17 | 7/6/17 | ... |
| 0034463962650 | Coconut Milk | Vegan Supply | 18 fl. oz. | 1 | 2.3 fl. oz. | 6/4/17 | 6/24/17 | ... |

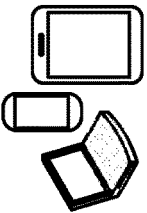

USER COMPUTING DEVICE(S) 102

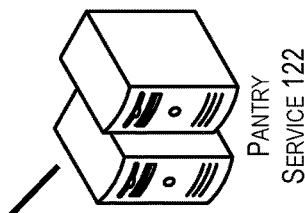

PANTRY SERVICE 122

FIG. 4

SYSTEM FOR SMART PANTRY MANAGEMENT USING CONSUMPTION DATA

BACKGROUND

At any given time, most households store large quantities of food items. Due to the quantity of food that is stored, it is often difficult for people to know what food items they have on hand, what food items they need to purchase more of, whether various food items are about to expire, etc. This lack of awareness of the status and/or quantity of stored food items also makes it hard for people to determine what recipes they can make with the food items that they have on hand. Additionally, when shopping people are often not confident that they have a required food item at home. Due to this lack of certainty, people will purchase the required food item to ensure that they have the required food item, which means that people often purchase redundant food items. Accordingly, there is a need for a system that allows users to more easily track and monitor the food items that they have on hand.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 4 is an example illustration of a data store that maintains food item information for food items in a pantry.

DETAILED DESCRIPTION

Figure 1:
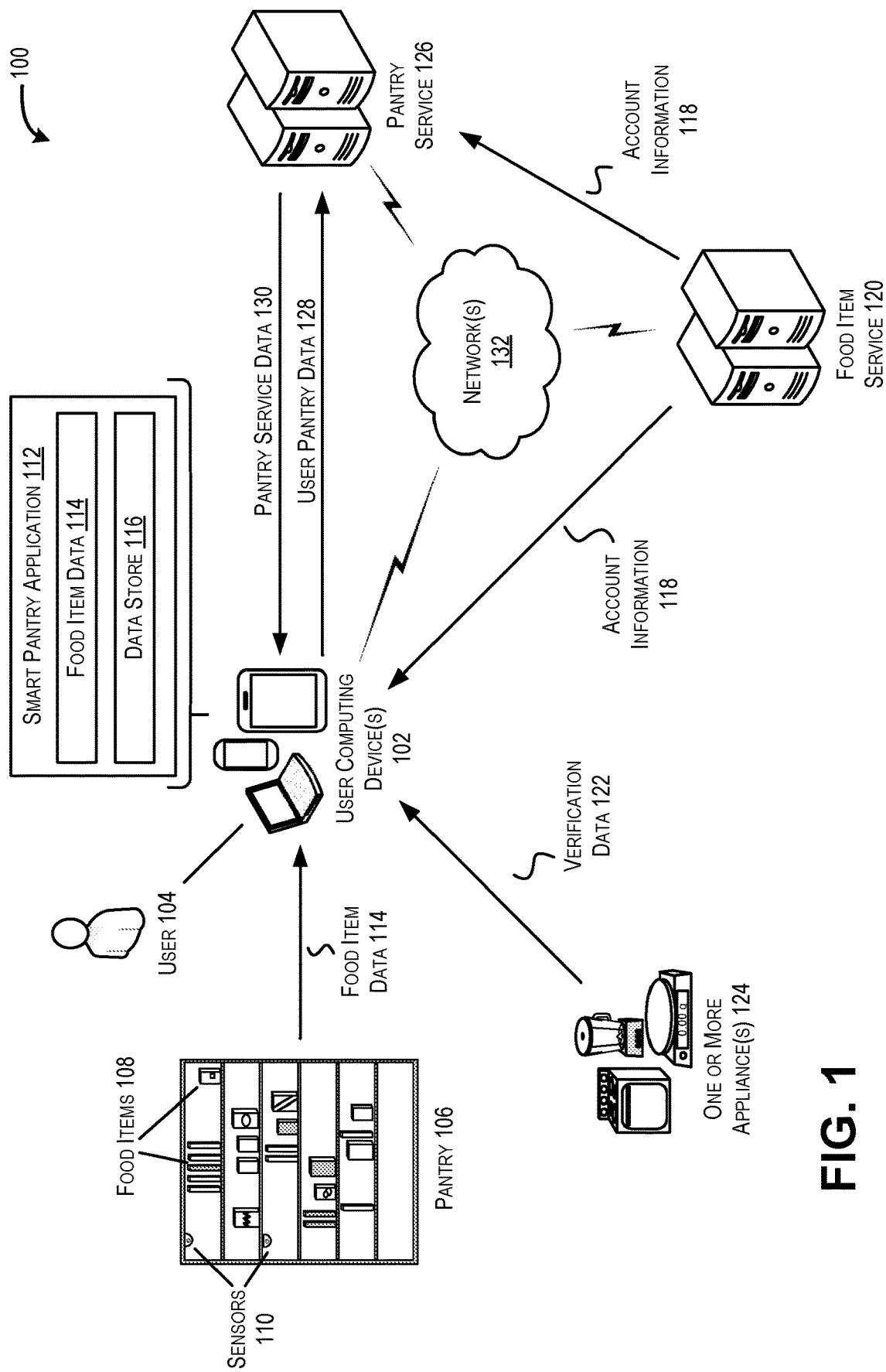
FIG. 1 is an illustrative environment for generating and updating a data store for monitoring food items stored in a smart pantry.

This disclosure is generally directed to a smart pantry system that is able to build a data store of the food items that a user or household has on hand, as well as information about those food items. The system may also maintain the data store in light of corroborated point of consumption (POC) data, and leverage the data store to provide recipe recommendations and/or notifications to the user. The data store may contain information associated with one or more food items stored in the smart pantry system, such as names of food items, brands of food items, number of units of food items, quantity of food items, expiration dates, dates that food items were purchased, nutrition information, etc. A food item may include any item of food or drink, including raw ingredients (e.g., eggs, butter, oats, milk, olive oil, carrots, gin, chicken breast, etc.), and prepared ingredients (e.g., ice cream, butter, pasta sauce, sangria, potato salad, etc.). The smart pantry system may include one or more electronic smart pantry devices for tracking the food items that a user has on hand, such as smart storage spaces, appliances, computing devices associated with a smart pantry application, etc. Smart storage spaces may include cabinets, shelving, or other storage resources that include one or more sensors for monitoring food items contained therein.

An appliance may include an electronic cooking scale, an electronic oven, an electronic blender, mixer, an electronic refrigerator, an electronic food thermometer, or other type of tool used to store and/or prepare food. In some embodiments, a computing device may be integrated into one or more of the appliances. For example, a kitchen appliance (i.e., refrigerator, blender, oven, etc.) may include a memory and processors that enable the kitchen appliance to present a graphical smart pantry interface on a display. A smart pantry application may include software that enables a computing device to maintain and update a data store of food item information. A smart pantry application may be run on a computing device associated with a user, such as a smartphone, tablet, personal computer, laptop, voice controlled computing device, server system, or other computing system that is able to execute and/or present one or more functionalities associated with the smart pantry application.

In some embodiments, a smart pantry application may use pantry data to build a data store of food items that are stored in an associated smart pantry. For example, the pantry data may be manually entered into the smart pantry application, may be acquired by scanning food items (e.g., bar code scan, QR code scan, RFID tag scan, photograph of food item packaging, etc.) with one or more sensors, photographing or scanning receipts of food items purchased from a vendor, or reading sensor data detected by one or more sensors in a smart storage space. Alternatively or in addition, a smart pantry application may build the data store of food items using information associated with one or more user accounts, such as grocery store membership accounts, an account with a shopping list application, accounts associated with electronic shopping services, credit card accounts, or other user accounts that may provide information relating to food items purchased or otherwise acquired by a user.

In some embodiments, a smart pantry may build or update a data store using information associated with consumption by a user. For example, a smart pantry may add food item information that corresponds to ingredients of a recipe that a user has indicated that he or she made. Alternatively or in addition, a smart pantry application may build or otherwise update a data store using POC data that verifies consumption of a food item based on recipe data and corresponding sensor data. For example, a computing device may include a recipe application that provides one or more recipe functionalities associated with a recipe. A recipe may include a set of instructional recipe steps for preparing a particular food or drink item. The recipe steps may include one or more actions performed during preparation of a recipe (e.g., adding an ingredient to a container, turning on a blender, preheating an oven, etc.). The recipe functionalities may include a graphical recipe interface, a series of visual and/or audio signals for guiding a user through a recipe, or a combination thereof. For example, the application may present a graphical recipe interface that includes a recipe step that a certain amount of an ingredient is to be added to a container that is on a kitchen scale.

Appliances associated with a smart pantry may include one or more components that detect and provide information associated with recipe steps to a recipe application. For example, a recipe application may direct a user to place a container on a kitchen scale, and add a first ingredient to the container. A kitchen scale may then detect that the container has been placed onto the scale, and/or detect a change in the mass of the container. This may involve a first detection that the mass of the container is increasing, and a second detection that the mass of the container has become stable (i.e., the mass has not changed more than a threshold amount for a period of time). The kitchen scale may then provide information data associated with the addition of the ingredient to the recipe application via a wired or wireless connection.

A recipe application may receive information data, verify that the information matches expected information for an ingredient of the recipe, and then generate verified POC data associated with the ingredient. In some embodiments, generating POC data may include causing a smart pantry application to update a data store to reflect a recipe application verifying that a consumer has an ingredient on hand. For example, based on a recipe application verifying that a user has added flour to a recipe, a smart pantry application may update the data store to include food item information corresponding to flour. Alternatively or in addition, the smart pantry may update the data store to reflect the verification of the user adding the ingredient. For example, based on a recipe application verifying that a user has added two eggs to a container, a smart pantry application may update a data store to reflect that the user's pantry has two less eggs. In some embodiments, a recipe application and a smart pantry application may be a single application.

In some embodiments, a smart pantry application may be able to provide recommendations or notifications to a user based on a data store. For example, a smart pantry application may provide notifications that a user food item is running low, or is about to expire. The smart pantry application may also provide recommendations of one or more recipes that a user can make with food items in a smart pantry, and/or that allow the user to use up an expiring food. When a user has selected a recipe that includes food items that are not included in the smart pantry, a smart pantry application may generate a shopping list and/or add the needed items to an existing shopping list.

The techniques, apparatuses, and systems described herein may be implemented in a number of ways. Example implementations are provided below with reference to the following figures.

FIG. 1 is a schematic diagram of an illustrative environment 100 for generating and updating a data store 116 for monitoring food items 108 stored in a smart pantry. The environment 100 may also include one or more electronic smart pantry devices for tracking food items 108 that user 104 has on hand, such as smart storage spaces (e.g., pantry 106), appliances (e.g., appliances 124), computing devices associated with a smart pantry application (e.g., user computing devices 102), etc. The user computing device 102 may include any type of device such as a laptop computer, personal computer, voice controlled computing device, a tablet device, a mobile telephone, etc. Any such device may include one or more processor(s), computer-readable media, speakers, a display, etc.

Pantry 106 may include one or more storage spaces for storing food items 108 (e.g., cabinets, shelving, refrigerators, freezers, or other storage resources). Food items 108 may include any item of food or drink, including raw ingredients (e.g., eggs, butter, oats, milk, olive oil, carrots, gin, chicken breast, etc.), and prepared ingredients (e.g., ice cream, butter, pasta sauce, sangria, potato salad, etc.). In some embodiments, one or more of the storages spaces of pantry 106 may include one or more sensors 110 for monitoring food items 108 contained therein. For example, pantry 106 may include one or more sensors that can scan or otherwise detect food items 108 stored within it, detect an amount of mass associated with one or more food items 108, etc.

FIG. 1 further depicts user computing devices 102 as including smart pantry application 112 that enables one or more of the computing devices 102 to utilize food item data 114 to generate and maintain a data store 116 of food items 108 stored in pantry 106. Food item data 114 may be information relating to one or more food items 108 such as types of food items 108, brands of food items 108, numbers of units of food items 108, quantity of food items 108, expiration dates, dates of purchase, nutrition information, etc. The data store 116 may be a database that contains food item data 114 associated with the food items 108 stored in pantry 106. For example, data store 116 may identify a collection of food items 108 that are stored in pantry 106. Additionally, data store 116 may store information associated with the individual food items 108, such as nutritional information; brand information; food types; flavors; quantities/amounts of individual food items 108 stored in pantry 106 (e.g., 2 boxes of ramen, 1.3 lbs. of sugar, 3.5 oz. of olive oil, etc.); dates individual food items 108 were purchased; expiration data associated with individual food items 108; and/or other information.

In some embodiments, food item data 114 may be manually entered into a smart pantry application 112 via user computing device(s) 102, or may be acquired by scanning food items 108 (e.g., bar code scan, QR code scan, RFID tag scan, photograph of food item 108 packaging, etc.), photographing or scanning receipts of food items 108 purchased from a vendor, or by reading sensor data from one or more sensors 110 in a smart storage space. For example, a user 104 may take a picture of a shopping receipt using a user computing device 102 (or another device), and a smart pantry application 112 may identify food items 108 that the shopping receipt indicates the user 104 purchased or otherwise obtained. In another example, a user 104 may use user computing device 102 or another device to take a picture of a bar code or the packaging of a can of creamed corn, and a smart pantry application 112 may then utilize a bar code identifier to update the data store 116 to reflect that one can of creamed corn has been added to pantry 106.

A smart pantry application 112 may also receive food item data 114 via account information 118 associated with one or more user accounts, such as grocery store membership accounts, an account with a shopping list application, accounts associated with electronic shopping services, credit card accounts, or other user accounts that may provide information relating to food items 108 purchased or otherwise acquired by an individual. The smart pantry application 112 may receive the account information from a food item service 120. Food item service 120 may be any entity, server(s), platform, etc. Food item service 120 may be associated with an electronic recipe marketplace (e.g., a website, electronic application, widget, etc.) that allows users 104 to search, browse, view and/or acquire (i.e., purchase, rent, lease, borrow, download, etc.) food items 108, with physical locations where users 104 may purchase food items 108 (e.g., grocery store member service), with entities that facilitate payment and/or acquisition of food items 108 (e.g., payment services, bank services, shipment services, etc.), or with a combination thereof. Food item service 120 may store account information 118 for one or more users 104 associated with the food item service 120. Stored account information 118 may include information corresponding to food items 108 purchased by users 104 (e.g., names of food items 108, brands of food items 108, number of units of food items 108, quantity of food items 108, expiration dates, dates that food items 108 were purchased, nutrition information, etc.). For example, a smart pantry application 112 may receive account information from a grocery store membership service that indicates food items 108 that were purchased by user 104. Alternatively or in addition, the smart pantry application 112 may receive account information 118 from an application executing on user computing device 102 and associated with the food item service 120.

In some embodiments, a smart pantry application 112 may build or update a data store 116 using information associated with consumption by a user 104. For example, a smart pantry application 112 may update a data store 116 to include food items 108 that correspond to ingredients of a recipe that user 104 indicates he or she has made. Alternatively or in addition, the smart pantry application may build or otherwise update the data store using point of consumption (POC) data that verifies the consumption of a food item 108, and which is generated based on recipe data and corroborating verification data 122 received from one or more appliances 124. The POC data may be generated by the smart pantry application 112, a POC application, or a combination thereof. A POC application may be an application for presenting a graphical recipe interface and/or a series of visual and/or audio signals that guide user 104 through the process of making a recipe, and generating verified consumption data based on verification data 122 received from appliances 124. For example, for individual steps of a recipe, a POC application may cause user computing device 102 to present an audio instruction to perform the step. In some embodiments, when a recipe step is associated with appliance 124, a POC application may also cause appliance 124 to present an audio or visual signal to draw the attention of the individual to an aspect of an appliance 124 such as a container on a kitchen scale. For example, a POC application may cause user computing device 102 to transmit a signal to appliance 124 that an audio or video signal is to be provided.

A recipe may include a set of instructional recipe steps for preparing a particular food or drink item. The recipe steps may include one or more actions performed during preparation of a recipe (e.g., adding an ingredient to a container, turning on a blender, preheating an oven, etc.). Appliances 124 may include one or more components that detect evidence of recipe actions, and provide verification data 122 associated with the recipe actions to the user computing device 102. The recipe actions may include one or more actions performed during preparation of a recipe, such as adding an ingredient to a container; turning on a blender; preheating an oven; inputting commands to a slow cooker, oven, or microwave oven (e.g., setting an oven to broil, setting a burner to medium, programming a microwave to cook for 2 minutes, etc.). Determining that an action has been completed may include for example a refrigerator or cabinet detecting that an ingredient has been removed and/or replaced with a reduced quantity (e.g., removed a bunch of 7 bananas, returned a bunch of 4 bananas), a thermometer indicating that a goal temperature has been achieved, or similar.

In some embodiments, verification data 122 may correspond to sensor data from one or more sensors located within appliance 124. For example, a blender may be capable of sensing when a container is placed on the blender, or detect a change in mass that occurs when a user 104 adds an ingredient to the blending container. Verification data 122 may also correspond to information provided by user 104 via a gesture, voice command, a physical interface, a graphical user interface, etc. Verification data 122 may correspond to one or more sounds picked up by a microphone element associated with the user computing device 102, appliances 124, or another device. The sounds may be indicative of a recipe action having been performed such as the sound of a blender running; a stand mixer mixing; a food processor chopping; a cabinet, refrigerator, oven, or microwave door being opened/closed; an alarm going off (e.g., microwave notification, timer alarm, oven notification that preheat is finished, etc.); the crack of an eggshell being broken; the hiss of a champagne bottle being opened; or similar.

A POC application may receive verification data 122 corresponding to a recipe ingredient. Verification data 122 may be transmitted from appliance 124 to user computing device 102 via a wired or wireless connection. In some embodiments, where a user computing device 102 is integrated into appliance 124, verification data 122 may be passed between one or more sensors of the appliance and a POC application via one or more internal connections. For example, where appliance 124 is a kitchen scale and user 104 adds an ingredient to a container placed upon the kitchen scale, appliance 124 may detect a change in mass of the container and transmit verification data 122 corresponding to the change of mass to a POC application. In another example, for a smoothie recipe the final recipe step may be to cause a kitchen blender appliance to blend the ingredients in a container. When user 104 presses a button to cause the kitchen blender appliance to initiate blending, the kitchen blender appliance may transmit verification data 122 that indicates that the user 104 has initiated blending.

A POC application may generate consumption data based on verification data 122 received from appliances 124. For example, once a POC application causes a recipe step to be presented to user 104, the POC application may wait for verification data 122 corresponding to the recipe step. The POC application may then verify that the ingredient has been added. Verifying that the ingredient has been added may include comparing sensor data included in verification data 122 to expected sensor information for the ingredient. For example, a POC application may know a change in mass that is to be expected when one cup of flour is added to a container, and may compare verification data 122 to the expected change in mass. If verification data 122 is within a threshold range of similarity (e.g., plus or minus a threshold percentage, a threshold numerical amount, etc.), then the POC application may verify the ingredient as being added. If verification data 122 is outside the threshold range, and is indicative of a mistake (i.e., user 104 added too much or too little of an ingredient) the POC application may provide an alert to the user 104 that there has been a mistake, and/or take action to adjust the recipe (e.g., adjust the proportions of other ingredients within the recipe to compensate for the mistake). If verification data 122 is outside the threshold range the POC application may check to see if verification data 122 matches an alternative ingredient (i.e., a substitution, a different ingredient in the recipe, etc.), and/or prompt user 104 to add a new ingredient.

A POC application may generate consumption data for a verified ingredient. The consumption data may identify the ingredient, an amount added, one or more times related to the pour event (e.g., time the pour started, time the pour finished, duration of the pour event, etc.), nutritional information for the poured ingredient, a brand or other identifier associated with the ingredient, a user identifier associated with the user 104 preparing the recipe, an indication that the ingredient was verified by information from the appliance 124, etc. The consumption data may correspond to the actual amount indicated in the verification data. For example, if a recipe calls for 33 g of butter to be added, but verification data 122 indicates that 35.7 g of butter was added to the recipe, a POC application may generate consumption information for 35.7 g of butter. Once a recipe application verifies that the ingredient has been added, the recipe application may cause another ingredient for a recipe to be presented.

In some embodiments, a POC application may also track ingredients that a user 104 has added without interacting with an appliance 124. For example, a POC application may receive audio input from a user 104 that an ingredient has been added. The POC application may then verify that the ingredient has been added based on the audio input. A POC application may also receive an input of one or more ingredients that have been added without use of an appliance 124 via graphical interface.

A POC application may identify that a recipe has been completed without verifying each individual ingredient of the recipe. For example, a POC application may determine that a recipe is complete when a threshold amount of the recipe is completed. In various embodiments the threshold amount may correspond to a number of verified ingredients added, or a percentage of ingredients being verified. A POC application may determine that a recipe is complete based on input from user 104 (e.g., via a gesture, voice command, a physical interface, a graphical user interface, etc.) or based on other verification data 122. For example, where the final step of a cookie recipe is to bake the cookies, a POC application may determine that all ingredients have been added when an oven appliance sends verification data 122 that the oven has been set to preheat to the correct temperature. The POC application may then verify that all ingredients have been added, and generate consumption data for all of the remaining unverified ingredients in the cookie recipe. Alternatively or in addition, in response to the oven being preheated, the POC application may prompt user 104 to indicate (via a gesture, voice command, a physical interface, a graphical user interface, etc.) what additional unverified ingredients have been added.

A POC application may transmit generated consumption data to a smart pantry application 112. Generated consumption data may be transmitted from a POC application to a smart pantry application 112 executing on user computing device 102 via a wired or wireless connection. In some embodiments, where a POC application and a smart pantry application 112 are executing on the same user computing device 102, generated consumption data may be passed to the smart pantry application 112 via one or more internal connections. In some embodiments, a smart pantry application 112 and a POC application may be a single application.

A smart pantry application 112 may generate and/or update data store 116 based on consumption data to reflect a POC application verifying that a user 104 has an ingredient (i.e., food item 108) on hand. For example, based on a POC application verifying that a user 104 has added balsamic vinegar to a recipe, a smart pantry application 112 may update a data store 116 to indicate that food item 108 "balsamic vinegar" is stored in pantry 106. Alternatively or in addition, the smart pantry application 112 may update the data store 116 to reflect the verification of the user 104 adding the ingredient. For example, based on a POC application verifying that a user 104 has added two cups of coconut milk to a container, a smart pantry application 112 may update a data store 116 by reducing the quantity of the food item 108 "coconut milk" by two cups. In this way, as the POC application determines that an individual food item 108 is consumed by user 104 and/or an amount of the individual food item 108 that is consumed, the smart pantry application 112 updates the data store 116 so that it reflects the current state of items 108 stored in pantry 106.

A smart pantry application 112 may provide recommendations or notifications to a user 104 based on a data store 116. In some embodiments, a smart pantry application 112 may provide notifications that an individual food item 108 is running low. For example, based on a sensor 110 in pantry 106 detecting that the mass of a food item 108 "brown sugar" is below a threshold amount (e.g., less than 5% of the initial package weight, less than 2 grams, etc.), the smart pantry application 112 may present a message to user 104 that he or she is running low on brown sugar. The smart pantry application 112 may also present the user 104 with functionality to obtain brown sugar, such as an option to add brown sugar to a shopping list, to purchase brown sugar via a food item service 120, etc.

A smart pantry application 112 may provide notifications that an individual food item 108 is about to expire. For example, when data store 116 indicates that food item 108 is about to expire, a smart pantry application 112 may present a user 104 with a visual indication, message, or other indication that the food item 108 is about to expire, and/or may provide a recommendation of one or more recipes that user 104 can make to consume the food item 108 before it expires.

In some embodiments, a smart pantry application 112 may be able to present an interface for user 104 to search for, select, and/or view recipes. The smart pantry application 112 may allow the user 104 to restrict a recipe search so as to only include recipes that the user 104 can make with food items 108 stored in the pantry 106. In some embodiments, a smart pantry application 112 may be able to present recommendations of recipes that can be made with food items 108 stored in pantry 106. The smart pantry application 112 may also present indications and/or notifications relating to whether or not the food items 108 required to make a recipe are stored in the pantry 106. In some embodiments, when a data store 116 indicates that one or more food items 108 which are required for a recipe that user 104 has selected are not stored in pantry 106, a smart pantry application 112 may present one or more functionalities for acquiring the required food item(s) 108, such a selectable element for generating a shopping list that includes the required food item(s) 108; adding the required food item(s) 108 to an existing shopping list; purchasing the required food item(s) 108 via a food item service 120, etc.

FIG. 1 further depicts environment 100 including pantry service 126. Pantry service 126 may be any entity, server(s), platform, etc. A smart pantry application 112 may share user pantry data 128 with pantry service 126. User pantry data 128 may correspond to information associated with portions of/and or all of data store 116. Pantry service 126 may provide one or more functionalities associated with a smart pantry application 112, such as providing notifications of food item alerts (i.e., expiration, item recalls, price changes, etc.), storage of recipe data corresponding to one or more recipes, storage of user consumption data, etc. In some embodiments, pantry service 126 may be associated with an electronic recipe marketplace (e.g., a website, electronic application, widget, etc.) that allows users 104 to search, browse, view and/or acquire (i.e., purchase, rent, lease, borrow, download, etc.) recipes. In some embodiments, pantry service 126 may receive recipe data corresponding to one or more recipes from user computing devices 102, other user computing devices, or a combination thereof.

In some embodiments, pantry service 126 may receive account information 118 from food item service 120. Pantry service 126 may then provide pantry service data 130 to user computing device 102. Pantry service data 130 may include notifications of food item alerts (i.e., expiration, item recalls, price changes, etc.), recipe data corresponding to one or more recipes, account information 118, or a combination thereof. FIG. 1 further illustrates each of the user computing device 102, food item service 120, and pantry service 126 as being connected to a network 132.

Figure 2:
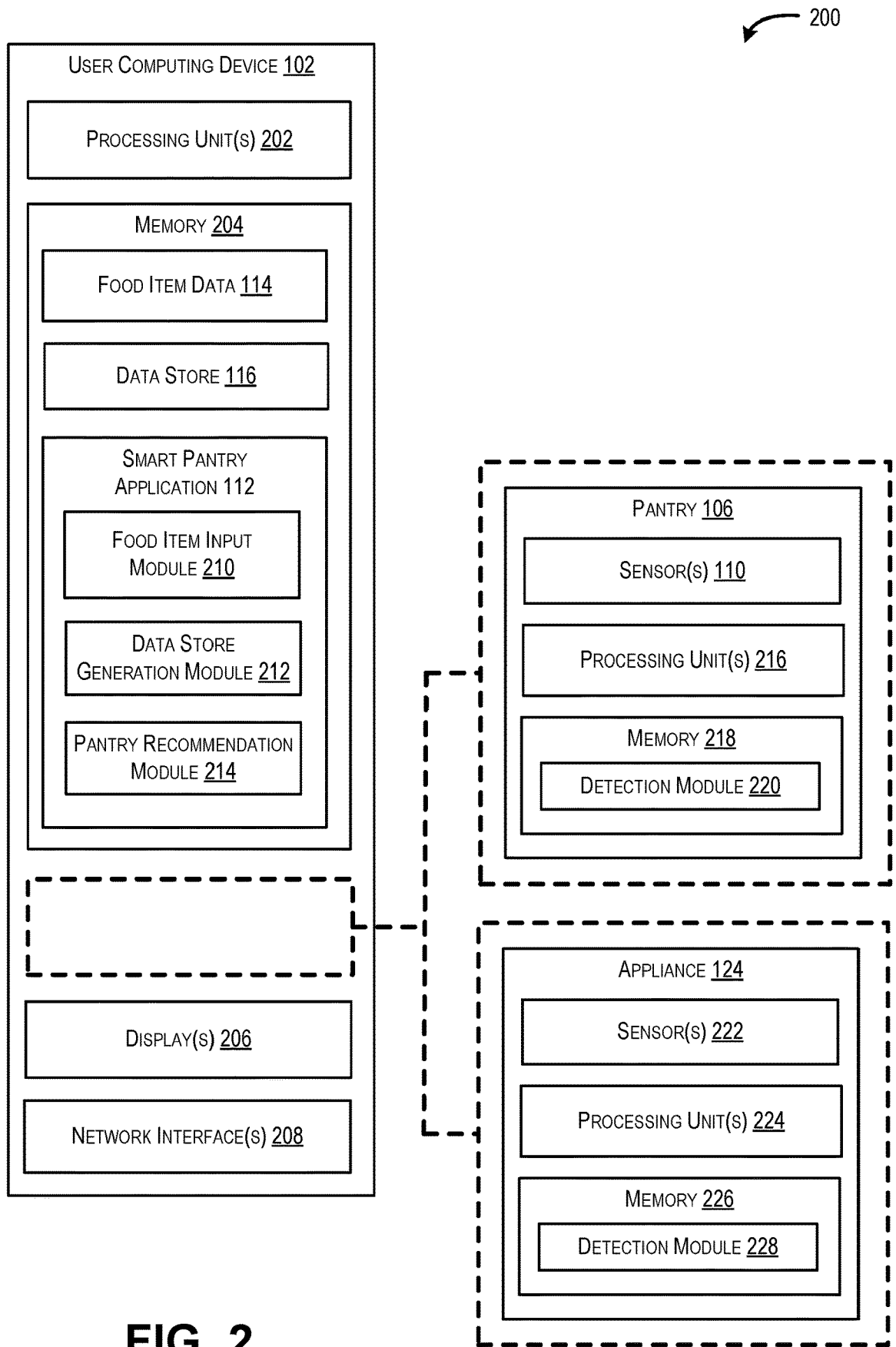
FIG. 2 is an illustrative computing architecture of a computing device configured to generate and manage a data store for monitoring food items stored in a smart pantry.

FIG. 2 is an illustrative computing architecture 200 of a computing device configured to generate and manage a data store 116 for monitoring food items 108 stored in a smart pantry. The computing architecture 200 may be used to implement the various systems, devices, and techniques discussed herein. In various embodiments, user computing device 102 may be implemented on any type of device, such as a laptop computer, personal computer, voice controlled computing device, a tablet device, a mobile telephone, etc.

In the illustrated implementation, the computing architecture 200 includes one or more processing units 202 coupled to a memory 204. The computing architecture may also include a display 206 and/or network interface 208. FIG. 2 further illustrates pantry 106 and appliance 124 as being separate from user computing device 102. However in some embodiments, one or more of pantry 106 and appliance 124 may be incorporated as a component of a user computing device 102, or vice versa.

User computing device 102 can include food item data 114 and a data store 116 stored on the memory 204. Food item data 114 may be information relating to one or more food items 108 such as types of food items 108, brands of food items 108, a location of individual food items 108 in pantry 106, numbers of units of food items 108, quantity of food items 108, expiration dates, dates of purchase, nutrition information, etc. Food items 108 may include any item of food or drink, including raw ingredients (e.g., eggs, butter, oats, milk, olive oil, carrots, gin, chicken breast, etc.), and prepared ingredients (e.g., ice cream, butter, pasta sauce, sangria, potato salad, etc.). Data store 116 may be a database that contains food item data associated with the food items 108 stored in pantry 106. For example, data store 116 may identify a collection of food items 108 that are stored in pantry 106. Additionally, data store 116 may store information associated with the individual food items 108, such as nutritional information; brand information; food types; flavors; quantities/amounts of individual food items 108 stored in pantry 106 (e.g., 2 boxes of ramen, 1.3 lbs. of sugar, 3.5 oz. of olive oil, etc.); dates individual food items 108 were purchased; expiration data associated with individual food items 108; and/or other information.

User computing device 102 can also include a smart pantry application 112 stored on the memory 204. The smart pantry application 112 may configured to receive and/or otherwise determine food item data 114, and generate and maintain a data store 116 of food items 108 stored in pantry 106 based on the food item data 114.

Smart pantry application 112 may include food item input module 210, data store generation module 212, and pantry recommendation module 214. As used herein, the term "module" is intended to represent example divisions of executable instructions for purposes of discussion, and is not intended to represent any type of requirement or required method, manner or organization. Accordingly, while various "modules" are described, their functionality and/or similar functionality could be arranged differently (e.g., combined into a fewer number of modules, broken into a larger number of modules, etc.). Further, while certain functions and modules are described herein as being implemented by software and/or firmware executable on a processor, in other instances, any or all of the modules can be implemented in whole or in part by hardware (e.g., a specialized processing unit, etc.) to execute the described functions. In various implementations, the modules described herein in association with user computing device 102 can be executed across multiple devices.

Food item input module 210 can be executable by the one or more processing units 202 to receive user 104 input, sensor data, verification data, etc., and generate food item data 114 associated with pantry 106. In some embodiments, food item data 114 may be manually entered by a user 104 via one or more interfaces associated with user computing device 102 or pantry 106. For example, food item input module 210 may present on display 206 a graphical user interface that presents functionality that allows a user 104 to selectively input the food items 108 that the user 104 is storing in the pantry 106.

Alternatively or in addition, food item input module 210 may generate food item data 114 based on sensor data received via sensors associated with user computing device 102 or pantry 106. For example, a user 104 may scan food items 108 with a sensor (e.g., bar code scan, QR code scan, RFID tag scan, photograph of food item 108 packaging, etc.) independent from, or incorporated into user computing device 102 and/or pantry 106, which may be used by food item input module 210 to generate food item data 114. In another example, a user 104 may photograph or otherwise scan receipts of food items 108 purchased from a vendor. Food item input module 210 may then identify a set of food items 108 that the shopping receipt indicates the user 104 purchased, and generate food item data 114 for the set of food items 108.

Alternatively or in addition, food item input module 210 may generate food item data 114 based on sensor data received via one or more sensors 110 in pantry 106. For example, sensor(s) 110 may detect images of food items 108 stored in pantry 106, detect RFID signal from food items 108 stored in pantry 106, etc. Sensor(s) 110 may also detect changes in mass, size, and/or volume of food items 108 stored in a pantry 106 over a period of time.

Food item input module 210 may also generate food item data 114 based on account information associated with one or more user accounts, such as grocery store membership accounts, an account with a shopping list application, accounts associated with electronic shopping services, credit card accounts, or other user accounts that may provide information relating to food items 108 purchased or otherwise acquired by an individual. Food item input module 210 may receive account information from a food item service 120, such as an electronic recipe marketplace (e.g., a website, electronic application, widget, etc.) that allows users 104 to search, browse, view and/or acquire (i.e., purchase, rent, lease, borrow, download, etc.) food items 108; a store having physical locations where users 104 may purchase food items 108 (e.g., grocery store member service); entities that facilitate payment and/or acquisition of food items 108 (e.g., payment services, bank services, shipment services, etc.); or a combination thereof. For example, food item input module 210 may receive account information from a payment service that indicates a set of food items 108 that were purchased by user 104, and then generate food item data 114 for the set of food items 108. Food item input module 210 may receive the account information from a server associated with the food service, a computing device associated with the food service, an application executing on user computing device 102, or a combination thereof.

In some embodiments, food item input module 210 may generate food item data 114 based on food items 108 that a user 104 is known to have consumed and/or otherwise used to make a recipe. For example, food item input module 210 may generate food item data 114 for food items 108 that correspond to ingredients of a recipe that user 104 indicates he or she made. Alternatively or in addition, food item input module 210 may generate food item data 114 using point of consumption (POC) data that verifies the consumption of a food item 108 based on recipe data and corroborating verification data 122 received from one or more appliances 124. For example, food item input module 210 may cause user computing device 102 to present a graphical recipe interface and/or series of visual and/or audio signals that guide user 104 through the process of making a recipe. For example, for individual steps of a recipe, user computing device 102 may present a visual or audio instruction to perform the step. A recipe may include a set of instructional recipe steps for preparing a particular food or drink item. The recipe steps may include one or more actions performed during preparation of a recipe (e.g., adding an ingredient to a container, turning on a blender, preheating an oven, etc.). In some embodiments, when a recipe step is associated with appliance 124, appliance 124 may present an audio or visual signal to draw the attention of the individual to an aspect of the appliance 124 such as a container on a kitchen scale. For example, the smart pantry application 112 may cause user computing device 102 to transmit a signal to appliance 124 that an audio or video signal is to be provided.

Appliance 124 may include one or more components that detect evidence of recipe actions, and provide verification data 122 associated with the recipe actions to user computing device 102. The recipe actions may include one or more actions performed during preparation of a recipe, such as adding an ingredient to a container; turning on a blender; preheating an oven; or inputting commands to a slow cooker, oven, or microwave oven (e.g., setting an oven to broil, setting a burner to medium, programming a microwave to cook for 2 minutes, etc.). Detection of recipe actions may be accomplished by a refrigerator or cabinet detecting that an ingredient has been removed and/or replaced with a reduced quantity (e.g., removed a bunch of 7 bananas, returned a bunch of 4 bananas), a thermometer indicating that a goal temperature has been achieved, or similar.

Food item input module 210 may generate food item data 114 for a recipe ingredient based on user computing device 102 receiving verification data 122 from an appliance 124 that corresponds to sensor information that is expected for the recipe ingredient. In some embodiments, verification data 122 may correspond to sensor data from one or more sensors 222 located within appliance 124. For example, a blender may be capable of sensing when a container is placed on the blender, or detect a change in mass that occurs when a user 104 adds an ingredient to the blending container. Verification data 122 may also correspond to information provided by user 104 via a gesture, voice command, a physical interface, a graphical user interface, etc. For example, verification data 122 may correspond to one or more sounds indicative of a recipe action having been performed (e.g., sound of a blender running; a stand mixer mixing; a food processer chopping; a cabinet, refrigerator, oven, or microwave door being opened/closed; an alarm going off; microwave notification; oven notification that preheat is finished; the crack of an eggshell being broken; the hiss of a champagne bottle being opened; etc.) that are picked up by a microphone element associated with the user computing device 102, appliances 124, or another device.

Verification data 122 may be transmitted from appliance 124 to user computing device 102 via a wired or wireless connection. In some embodiments, where user computing device 102 is integrated into appliance 124, verification data 122 may be passed between one or more sensors of the appliance and food item input module 210 via one or more internal connections. For example, where appliance 124 is a kitchen scale and user 104 adds an ingredient to a container placed upon the kitchen scale, appliance 124 may detect a change in mass of the container and transmit verification data corresponding to the change of mass to food item input module 210. In another example, for a bread recipe the final recipe step may be to bake the dough in an oven at a set temperature for a set period of time. When user 104 presses a button to cause an oven appliance to preheat to the set temperature, the oven appliance 124 may transmit verification data that indicates that the user 104 has initiated the baking of the dough.

Food item input module 210 may generate food item data 114 based on verification data 122 received from appliances 124. For example, once smart pantry application 112 causes a recipe step to be presented to a user 104, the food item input module 210 may wait for verification data corresponding to the recipe step. Food item input module 210 may then verify that the ingredient has been added, and generate food item data 114 for a food item 108 associated with the ingredient. Verifying that the ingredient has been added may include comparing the sensor data included in the verification data to expected sensor information for the ingredient. For example, food item input module 210 may know a change in mass that is to be expected when two tablespoons of baking soda are added to a container, and may compare verification data 122 to the expected change in mass. If verification data 122 is within a threshold range of similarity (e.g., plus or minus a threshold percentage, a threshold numerical amount, etc.), then food item input module 210 may verify that the ingredient has been added, and generate food item data 114 for the ingredient.

If verification data 122 is outside the threshold range, and is indicative of a mistake (i.e., user 104 added too much or too little of an ingredient) food item input module 210 may provide an alert to the user 104 that there has been a mistake, and/or take action to adjust the recipe (e.g., adjust the proportions of other ingredients within the recipe to compensate for the mistake). Alternatively or in addition, if verification data 122 is outside the threshold range food item input module 210 may check to see if the verification data matches an alternative ingredient (i.e., a substitution, a different ingredient in the recipe, etc.), and/or prompt user 104 to add a identify the ingredient that was added. Food item input module 210 may then generate food item data 114 for the alternative ingredient or the ingredient identified by the user 104.

In some embodiments, sensor data, verification data, or user 104 input may include an identifier associated with a food item 108, and generating food item data 114 may include food item input module 210 using the identifier to access item information associated with the food item 108. For example, where food item input module 210 receives data associated with an item barcode information, food item input module 210 may use the barcode information to obtain information corresponding to the food item 108 from a food item resource, such as a locally stored database, a network resource, etc. In another example, where food item input module 210 receives an image of the packaging of a food item 108, food item input module 210 may identify a name, brand, or other identifier of the food item 108 within the image, which food item input module 210 may use to request food item information from a locally stored database, a network resource, etc.

In some embodiments, generating food item data 114 may correspond to food item input module 210 converting sensor data into food item information. For example, food item input module 120 may receive sensor data from a sensor incorporated into a scale that corresponds to an item having a mass of 259 grams being placed on the scale. Food item input module 120 may then generate food item data 114 that corresponds to the item having a mass of 259 g. For example, where food item input module 210 has determined that the sensor data corresponds to food item 108 "flour," the corresponding food item data 114 may identify that the amount of mass of flour stored in pantry 106 is reduced by 259 g, and that this mass corresponds to approximately 2.16 cups of flour.

Data store generation module 212 can be executable by the one or more processing units 202 to generate and/or update data store 116 associated with pantry 106. Data store 116 may be a database that contains food item data 114 associated with the food items 108 stored in pantry 106. Data store generation module 212 may generate data store 116 based on food item data 114 generated or otherwise received by food item input module 210. For example, data store 116 may identify a collection of food items 108 that are stored in pantry 106. Additionally, data store 116 may store information associated with the individual food items 108, such as nutritional information; brand information; food types; flavors; state information of individual food items 108 (e.g., quantities/amounts of individual food items 108 stored in pantry 106, dates individual food items 108 were purchased, expiration data associated with individual food items 108, etc.); and/or other information.

Data store generation module 212 may also update an existing data store 116 based on food item data 114 generated or otherwise received by food item input module 210. For example, based on food item input module 210 verifying that a user 104 has added one cup of olive oil to a recipe, data store generation module 212 may update data store 116 to indicate that there is one cup less of the food item 108 "olive oil" in pantry 106. Alternatively or in addition, data store generation module 212 may update data store 116 to reflect the user 104 storing a new food item 108 in pantry 106. For example, in response to a user 104 scanning a shopping receipt, data store generation module 212 may update data store 116 to include food item information that corresponds to food items 108 associated with the shopping receipt. In this way, as food item input module 210 generates new food item data 114, data store generation module 212 updates data store 116 so that it reflects the current state of items stored in pantry 106.

Pantry recommendation module 214 can be executable by the one or more processing units 202 to provide recommendations or notifications to a user 104 based on data store 116. In some embodiments, pantry recommendation module 214 may provide notifications that an amount/quantity of an individual food item 108 stored in pantry 106 has dropped below a threshold value. For example, based on a sensor in pantry 106 detecting that the mass of a food item 108 "coconut milk" is below a threshold amount (e.g., less than 5% of the initial package weight, less than 2 grams, etc.), pantry recommendation module 214 may present a message that a user 104 is running low on coconut milk. Pantry recommendation module 214 may also present the user 104 with functionality to acquire coconut milk, such as an option to add coconut milk to a shopping list, to purchase brown sugar via a food item service 120, etc.

In some embodiments, pantry recommendation module 214 may provide notifications that an individual food item 108 is about to expire. For example, data store 116 may include information relating to a time of purchase and/or an expiration date associated with individual food items 108, and when data store 116 indicates that a food item 108 is about to expire, pantry recommendation module 214 may present a user 104 with a visual indication, message, or other indication that the food item 108 is about to expire, and/or may provide a recommendation of one or more recipes that user 104 can make to consume the food item 108 before it expires.

In some embodiments, smart pantry application 112 may be able to present an interface for user 104 to search for, select, and/or view recipes. Smart pantry application 112 may allow the user 104 to restrict a recipe search so as to only include recipes that the user 104 can make with food items 108 stored in the pantry 106. In some embodiments, smart pantry application 112 may be able to present recommendations of recipes that can be made with food items 108 stored in pantry 106. Smart pantry application 112 may also present indications and/or notifications relating to whether or not the food items 108 required to make a recipe are stored in the pantry 106. In some embodiments, when data store 116 indicates that one or more food items 108 which are required for a recipe that user 104 has selected are not stored in pantry 106, smart pantry application 112 may present one or more functionalities for acquiring the required food item(s) 108, such a selectable element for generating a shopping list that includes the required food item(s) 108; adding the required food item(s) 108 to an existing shopping list; purchasing the required food item(s) 108 via a food item service 120, etc.

FIG. 2 further depicts pantry 106 and appliance 124. Pantry 106 may include one or more storage spaces for storing food items 108 (e.g., cabinets, shelving, refrigerators, freezers, or other storage resources). In some embodiments, one or more of the storages spaces of pantry 106 may include one or more sensors 110 for monitoring food items 108 contained therein. Sensors 110 may include any combination of one or more optical sensors (e.g., camera, barcode scanner, etc.), pressure sensors (e.g., capacitance sensors, piezoelectric sensors, etc.), acoustic sensors (e.g., microphones, etc.), or other sensors capable of receiving input or other otherwise detecting characteristics of food items 108 in pantry 106 and/or the environment of pantry 106. For example, pantry 106 may include one or more sensors that can capture photographs of the labels and/or packaging of food items 108 stored within the pantry 106. In some embodiments, pantry 106 may further include processing unit(s) 216, and memory 218. Pantry 106 can include detection module 220 stored on the memory 218. Detection module 220 can be executable by the one or more processing units 216 to monitor sensor data from sensors 110 and transmit the sensor data to user computing device 102. In some embodiments, detection module 220 may also be configured to generate food item data 114 based on the sensor data, and transmit the food item data 114 to user computing device 102.

Appliance 124 may be a scale, oven, blender, mixer, refrigerator, food thermometer, or other type of tool used to store and/or prepare food. Appliance 124 may include one or more sensors 222 that detect evidence of ingredients being added and/or recipe steps being executed. Sensors 222 may include any combination of one or more optical sensors (e.g., camera, barcode scanner, etc.), pressure sensors (e.g., capacitance sensors, piezoelectric sensors, etc.), acoustic sensors (e.g., microphones, etc.), or other sensors capable of receiving input or other otherwise detecting characteristics of appliance 124 and/or the environment of appliance 124.

In some embodiments, appliance 124 may further include processing unit(s) 224 and memory 226. Appliance 124 can include a detection module 228 stored on the memory 226. Detection module 228 can be executable by one or more processing units 224 to monitor sensor data from sensors 222 and transmit the sensor data to user computing device 102.

Those skilled in the art will appreciate that the architecture described in association with user computing device 102, pantry 106, and appliance 124 are merely illustrative and is not intended to limit the scope of the present disclosure. In particular, the computing system and devices may include any combination of hardware or software that can perform the indicated functions, including computers, network devices, internet appliances, and/or other computing devices. User computing device 102, pantry 106, and appliance 124 may also be connected to other devices that are not illustrated, or instead may operate as a stand-alone system. In addition, the functionality provided by the illustrated components may in some implementations be combined in fewer components or distributed in additional components. For example, in some embodiments user computing device 102 may be incorporated into pantry 106, appliance 124, or both. Similarly, in some implementations, the functionality of some of the illustrated components may not be provided and/or other additional functionality may be available.

The one or more processing unit(s) 202, 216, and 224 may be configured to execute instructions, applications, or programs stored in the memory(s) 204, 218, and/or 226. In some examples, the one or more processing unit(s) 202, 216, and 224 may include hardware processors that include, without limitation, a hardware central processing unit (CPU), a graphics processing unit (GPU), and so on. While in many instances the techniques are described herein as being performed by the one or more processing units unit(s) 202, 216, and 224, in some instances the techniques may be implemented by one or more hardware logic components, such as a field programmable gate array (FPGA), a complex programmable logic device (CPLD), an application specific integrated circuit (ASIC), a system-on-chip (SoC), or a combination thereof.

The memory 204, 218, and 226 is an example of non-transitory computer-readable media. Computer-readable media may include two types of computer-readable media, namely computer storage media and communication media. Computer storage media may include volatile and nonvolatile, removable, and non-removable media implemented in any method or technology for storage of information, such as computer readable instructions, data structures, program modules, or other data. Computer-readable storage media includes, but is not limited to, random access memory (RAM), read-only memory (ROM), erasable programmable read-only memory (EEPROM), flash memory or other memory technology, compact disc read-only memory (CD-ROM), digital versatile disk (DVD), or other optical storage, magnetic cassettes, magnetic tape, magnetic disk storage or other magnetic storage devices, or any other non-transitory or non-transmission medium that may be used to store the desired information and which may be accessed by a computing device. In general, computer storage media may include computer-executable instructions that, when executed by one or more processing units, cause various functions and/or operations described herein to be performed.

Additionally, a computer media includes data stored within a modulated data signal. For example, a computer media may include computer readable instructions, data structures, program modules, modulated carrier waves, other modulated transmission mechanisms, etc. However, as defined herein, computer storage media does not include communication media. Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated environment 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from user computing device 102, pantry 106, and/or appliance 124 may be transmitted to user computing device 102, pantry 106, and/or appliance 124 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium.

Additionally, the network interface 208 includes physical and/or logical interfaces for connecting the respective computing device(s) to another computing device or network. For example, the network interface 208 may enable WiFi-based communication such as via frequencies defined by the IEEE 802.11 standards, short range wireless frequencies such as Bluetooth®, or any suitable wired or wireless communications protocol that enables the respective computing device to interface with the other computing devices.

The architectures, systems, and individual elements described herein may include many other logical, programmatic, and physical components, of which those shown in the accompanying figures are merely examples that are related to the discussion herein.

Figure 3:
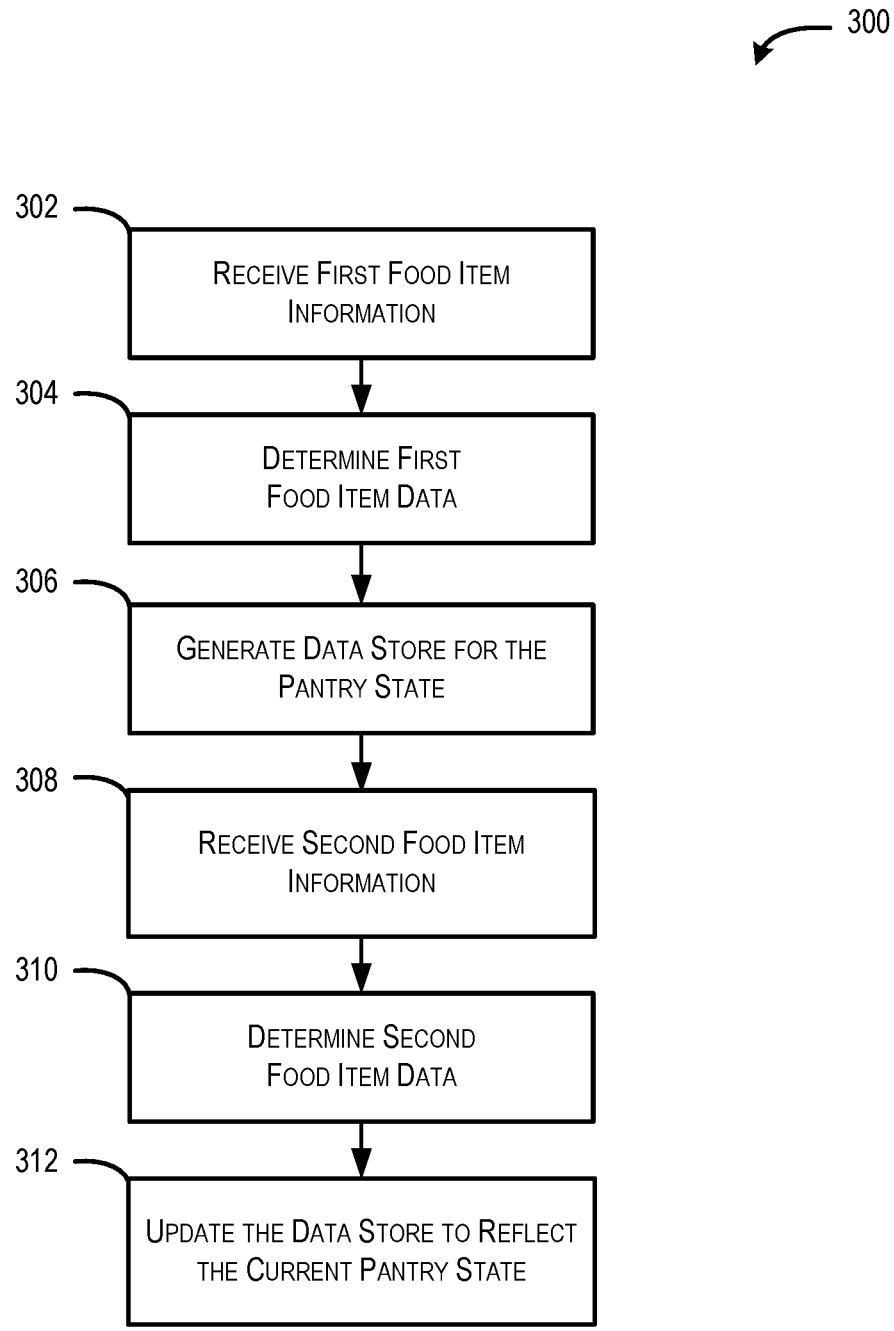
FIG. 3 is a flow diagram of an illustrative process for generating and managing a data store for monitoring food items stored in a smart pantry.
Figure 5:
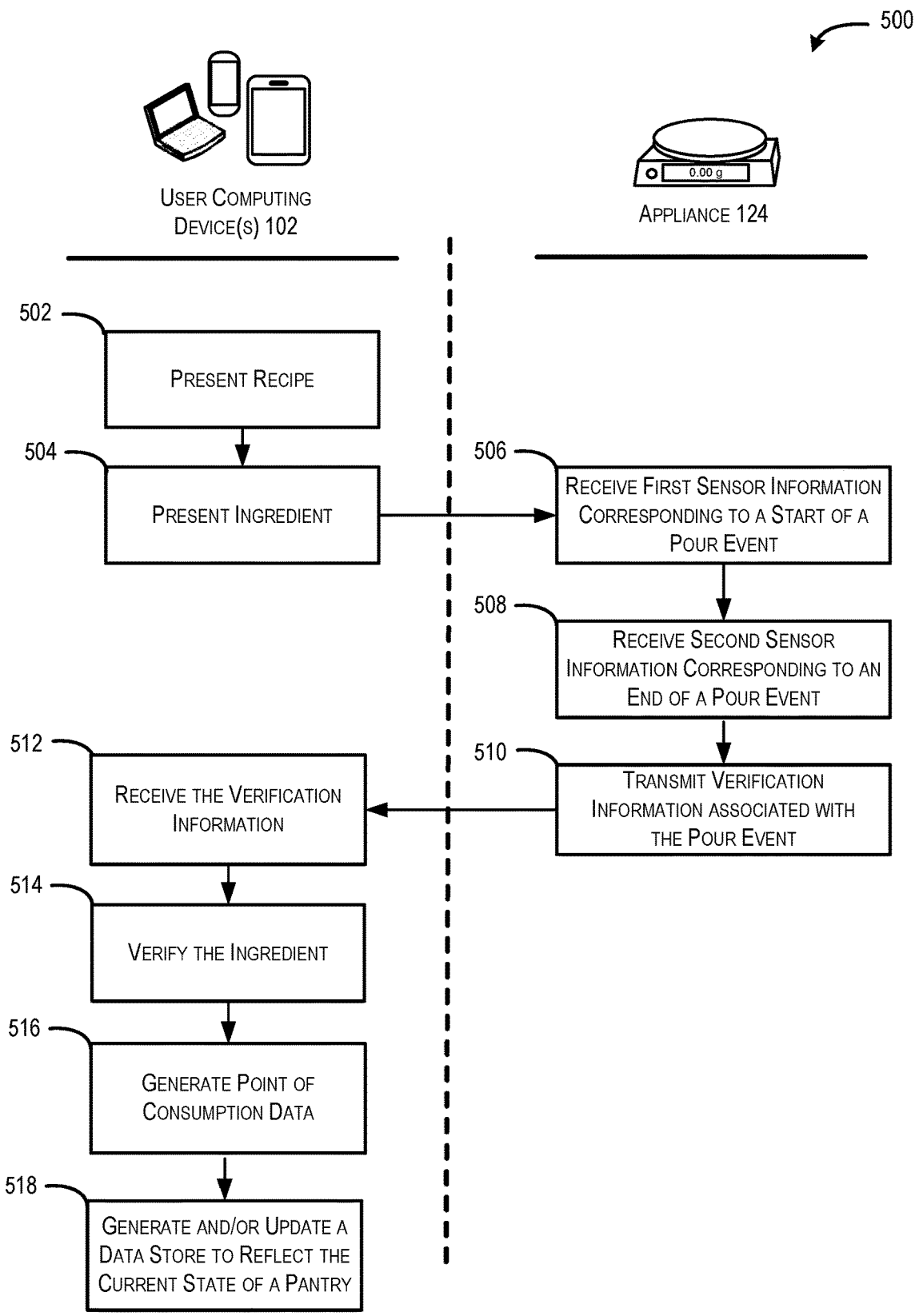
FIG. 5 is a flow diagram of an illustrative process for using corroborated point of consumption (POC) data for food consumed by an individual to generate and manage a data store for monitoring food items stored in a smart pantry.
Figure 6:
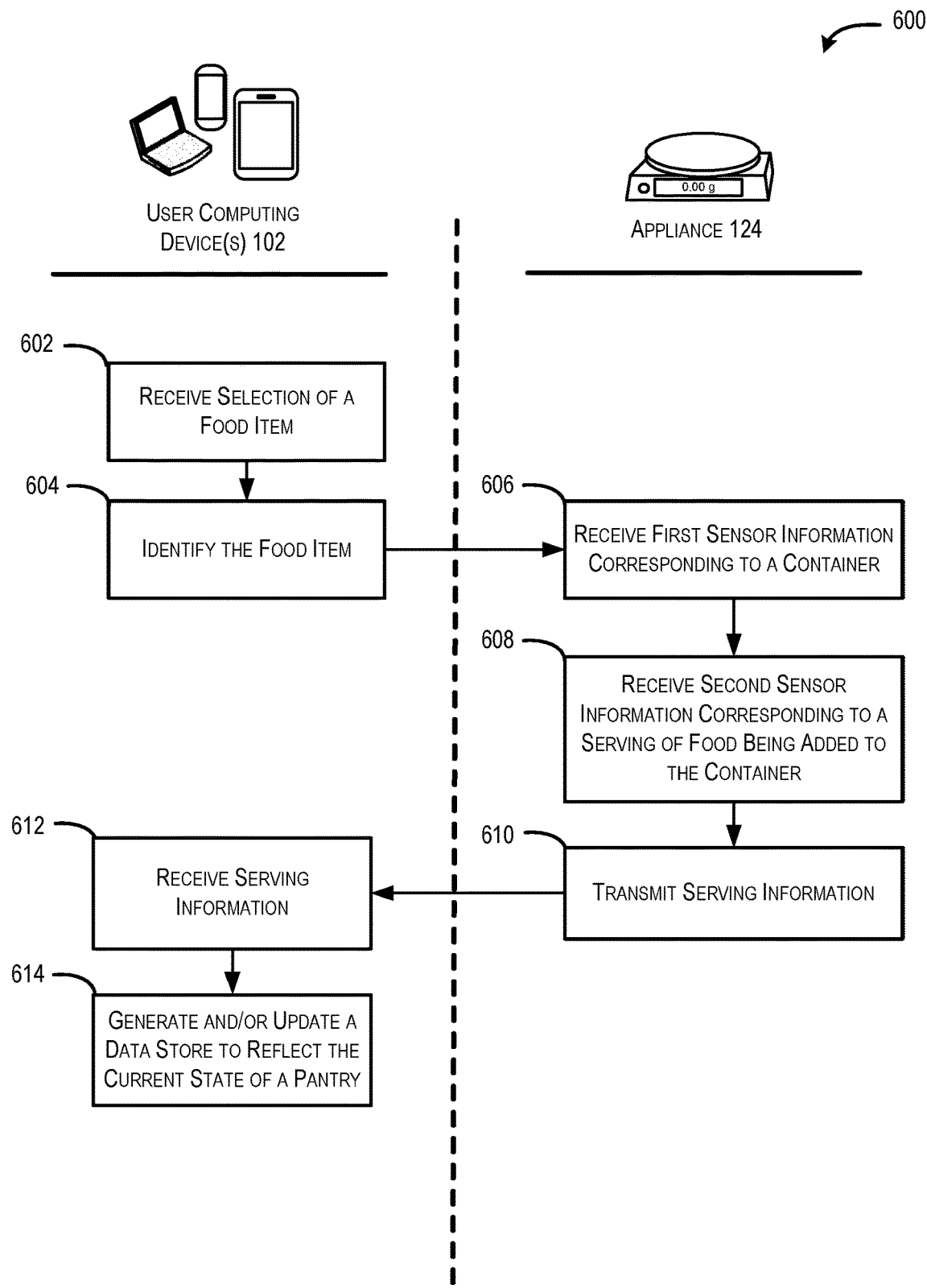
FIG. 6 is a flow diagram of an illustrative process for generating and managing a data store for monitoring food items stored in a smart pantry based on corroborated point of consumption (POC) data for food consumed by an individual.

FIGS. 3, 5, and 6 are flow diagrams of illustrative processes illustrated as a collection of blocks in a logical flow graph, which represent a sequence of operations that can be implemented in hardware, software, or a combination thereof. The blocks are organized under entities and/or devices that may implement operations described in the blocks. However, other entities/devices may implement some blocks. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 3 is a flow diagram of an illustrative process 300 for generating and managing a data store for monitoring food items 108 stored in a smart pantry. The process 300 may be implemented by the computing architecture 200 and in the environment 100 described above, or in other environments and architectures.

At 302, user computing device 102 receives first food item information. The first food information may correspond to user 104 input, sensor information, user 104 account information, user 104 point of consumption (POC) data, or other data that indicates that one or more first food items 108 have been purchased and/or used in association with a user 104. In some embodiments, the first food item information may be manually entered into a user computing device 102, may be acquired by scanning the one or more first food items 108 (e.g., bar code scan, QR code scan, RFID tag scan, photograph of food item packaging, etc.), photographing/scanning receipts of the one or more first food items 108 purchased from a vendor, via sensor data from one or more sensors 110 in a smart storage space, etc.

Alternatively or in addition, first food item information may be received by user computing device 102 via account information associated with one or more user 104 accounts, such as grocery store membership accounts, an account with a shopping list application, accounts associated with electronic shopping services, credit card accounts, or other user 104 accounts that may provide information relating to food items 108 purchased or otherwise acquired by an individual. In some embodiments, first food information may be received from one or more applications and or/programs executing on user computing device 102 or another computing device.

At 304, user computing device 102 determines first food item data. First food item data may be information relating to the first one or more food items 108, such as types of food items 108; names of food items 108; brands of food items 108; number of units of food items 108; quantity of food items 108 remaining in a unit; expiration dates; dates that food items 108 were purchased; nutrition information; etc. In some embodiments, user computing device 102 determines first food item data based on the first food item information. In some embodiments, user computing device 102 may determine one or more portions of first food data directly from the first food item information. For example, user computing device 102 may identify within a scanned image of a receipt quantities of food items 108 listed on the receipt. In another example, user computing device 102 may identify names of food items 108 within a description of the food items 108 that was input by a user 104.

Alternatively, or in addition user computing device 102 may indirectly use information from the first food item information to determine one or more portions of the first food item data. For example, the user computing device 102 may utilize an identifier associated with a food item 108 (e.g., name, UPC code, etc.) to access food data for the food item 108. In some embodiments, user computing device 102 may use the identifier to request food item information from a locally stored database. Alternatively or in addition, user computing device 102 may use the identifier to request food item information from a network resource, such as food item service 120 or pantry service 126.

At 306, user computing device 102 generates a data store for the pantry state. The data store may be a database that contains food item data associated with the food items 108 stored in pantry. In some embodiments, user computing device 102 may generate the data store based on the first food item data. The data store may identify a collection of food items 108 that are stored in pantry, and/or information associated with the individual food items 108, such as nutritional information; brand information; food types; flavors; quantities/amounts of individual food items 108 stored in pantry 106 (e.g., 2 boxes of ramen, 1.3 lbs. of sugar, 3.5 oz. of olive oil, etc.); dates individual food items 108 were purchased; expiration data associated with individual food items 108; and/or other information.

At 308, user computing device 102 receives second food item information. Second food information may correspond to user 104 input, sensor information, user 104 account information, user 104 point of consumption (POC) data, or other data that indicates one or more second food items 108 purchased and/or used in association with a user 104. Second food information may be received from one or more sources of the first food item information, one or more different sources, or a combination thereof. For example, second food item information may correspond to a scan of a shopping receipt that identifies the one or more second food items 108 as having been purchased.

At 310, user computing device 102 determines second food item data. Second food item data may be information relating to the second one or more food items 108, such as types of food items 108; names of food items 108; brands of food items 108; number of units of food items 108; quantity of food items 108 remaining in a unit; expiration dates; dates that food items 108 were purchased; nutrition information; etc. In some embodiments, user computing device 102 determines second food item data based on the second food item information. In some embodiments, user computing device 102 may determine one or more portions of the second food data directly from the second food item information, may indirectly use information from the second food item information to determine one or more portions of the second food data, or a combination thereof.

At 312, user computing device 102 updates a data store for reflect the current pantry state. In some embodiments, user computing device 102 may update the data store using the second food item data, such that the data store reflects the second food item information. For example, based on second food data corresponding to a user 104 having consumed two cups of flour, user computing device 102 may update the data store such that it reflects that the pantry 106 now contains two cups less of flour. In this way, as user computing device 102 receives new food item information, user computing device 102 updates the data store so that it reflects the current state of items stored in pantry 106.

FIG. 4 is an illustration 400 of a data store that maintains food item information for food items 108 in a pantry 106. FIG. 4 depicts a data store 116 that contains food item data 114 associated with the food items 108 stored in a pantry 106. Food item data 114 may include information associated with the individual food items 108, such as identifiers for individual food items 108; nutritional information; brand information; food types; flavors; quantities/amounts of individual food items 108 stored in pantry; dates individual food items 108 were purchased; expiration data associated with individual food items 108; and/or other information. FIG. 4 illustrates that portions of data store 116 may be stored on one or more memories associated with user computing device 102, pantry service 126, or both.

FIG. 5 is a flow diagram of an illustrative process 500 for using corroborated point of consumption (POC) data for food consumed by an individual to generate and manage a data store for monitoring food items 108 stored in a smart pantry. The process 500 may be implemented by the computing architecture 200 and in the environment 100 described above, or in other environments and architectures.

At 502, user computing device 102 presents a recipe. A recipe may include a set of instructions for preparing a particular food or drink item. In some embodiments, presenting the recipe may include causing a graphical recipe interface to be presented on a display. In some embodiments, the graphical recipe interface presents one or more recipe steps, including adding ingredients, that are to be performed. The display may be part of the user computing device 102, or may be a component of another computing device. In embodiments where the user computing device 102 is incorporated as part of an appliance 124, the graphical recipe interface may be presented on a display incorporated into the appliance 124.

At 504, user computing device 102 identifies an expected ingredient. For example, the user computing device 102 may determine an ingredient that is to be next added during completion of the recipe. An ingredient may include any component of a recipe, including raw food items 108 (e.g., eggs, butter, oats, carrots, chicken breast, etc.), and prepared food items 108 (e.g., ice cream, butter, pasta sauce, etc.). The expected ingredient may be selected based on a predetermined order associated with the recipe (e.g., always start recipe by adding flour), a suggested ingredient order (e.g., dry ingredients must be added before wet ingredients), past user 104 behavior, contextual data, or other factors. In some embodiments, once the expected ingredient has been selected, user computing device 102 may cause the graphical recipe interface to include an ingredient block corresponding to the expected ingredient. Alternatively or in addition, user computing device 102 may cause an audio instruction to add the ingredient to be presented.

At 506, an appliance 124 receives first sensor information corresponding to a start of a pour event. In some embodiments, the appliance 124 may be a kitchen scale configured to detect that an ingredient is being added to a container. For example, where the user computing device 102 has directed an individual to add an ingredient to a container, a kitchen scale may detect that a container has been placed onto the scale, and then detect a change in the mass of the container indicative of an ingredient being added.

At 508, appliance 124 receives second sensor information corresponding to an end of the pour event. In some embodiments, the second sensor information may correspond to the mass of the container becoming stable. For example, where the appliance 124 is a kitchen scale, and where the kitchen scale has detected a change in mass of the container indicative of an ingredient being added, the kitchen scale may detect that the mass of the container has remained stable for a set period of time. In some embodiments, a kitchen scale may determine that the mass has remained stable based on the mass remaining within a threshold range for a preset period of time.

At 510, appliance 124 transmits verification information associated with the pour event to the user computing device 102. For example, appliance 124 may determine a portion of sensor data that is indicative of a pour event, and transmit the portion of data to the user computing device 102. Alternatively, transmitting the verification information may include the appliance 124 transmitting all sensor data to the user computing device 102. The verification information may be transmitted from appliance 124 to user computing device 102 via a wired or wireless connection. In some embodiments, where user computing device 102 is integrated into appliance 124, the verification information may be passed between one or more sensors of the appliance and a point of consumption application executing on the user computing device 102 via one or more internal connections.

At 512, user computing device 102 receives verification information from the appliance 124. For example, where appliance 124 is a kitchen scale and an ingredient is added to a container placed upon the kitchen scale, appliance 124 may transmit verification data 122 corresponding to one or more of the change of mass, an initial mass, a final mass, timing information for the pour event, etc.

At 514, user computing device 102 verifies the ingredient as being added. For example, user computing device 102 may compare the sensor data included in the verification information to expected sensor information for the expected ingredient. In some embodiments, user computing device 102 may know a change in mass that is to be expected when an ingredient is added, and may compare the verification data to the expected change in mass. The expected sensor information may be included within the recipe data for the recipe, or may be computed by user computing device 102 using characteristics of the ingredient. For example, recipe data for the recipe may indicate that one teaspoon of baking soda has a mass of 11 grams. User computing device 102 can then compute the expected sensor information for 2 tablespoons of baking soda using the ratio of 1 tsp.=11 g.

If the verification information indicates that the sensor data is within a threshold range of similarity (e.g., plus or minus a threshold percentage, a threshold numerical amount, etc.), then user computing device 102 may verify the ingredient as having been added. If the verification information is outside the threshold range, user computing device 102 may determine that the sensor data is indicative of a mistake by the user 104 (i.e., the user 104 added too much or too little of an ingredient), and the user computing device 102 may cause an alert to be provided to the user 104. Alternatively or in addition, user computing device 102 may present a notification to the user 104 that there has been a mistake, and/or present a suggested action for the user 104 to take fix the mistake (e.g., adjust the proportions of other ingredients within the recipe to compensate for the mistake).

At 516, user computing device 102 generates and stores point of consumption (POC) data for the ingredient. In some embodiments, the generated POC data may correspond to the actual amount indicated in the verification information. For example, if a recipe calls for 210 g of chicken breast (i.e., one chicken breast) to be added, but verification information indicates that 198 g was detected by appliance 124, user computing device 102 may generate POC data for 198 g of chicken breast. In other words, user computing device 102 may generate POC data that corresponds to the amount of the ingredient that is actually added by the user 104, and not the amount of the ingredient that the recipe called for. In some embodiments, POC data may identify an ingredient, an amount added, one or more times related to the pour event (e.g., time the pour started, time the pour finished, duration of the pour event, etc.), nutritional information for the poured ingredient, a brand or other identifier associated with the ingredient, a user identifier associated with the user 104 preparing the recipe, an indication that the ingredient was verified by information from the appliance, etc.

At 518, user computing device 102 generates and/or updates a data store 116 to reflect the current state of a pantry 106. The data store 116 may be a database that identifies a collection of food items 108 that are stored in a pantry 106, and/or information associated with the individual food items 108, such as nutritional information; brand information; food types; flavors; quantities/amounts of individual food items 108 stored in the pantry (e.g., 2 tins of peanuts, 1.2 lbs. of flour, 3.5 oz. of chocolate syrup, etc.); dates individual food items 108 were purchased; expiration data associated with individual food items 108; and/or other information.

In some embodiments, user computing device 102 may generate and/or update a data store 116 based on POC data. For example, where POC data corresponds to ½ cup of olive oil being added, user computing device 102 may update a data store 116 to reflect that the amount of olive oil stored in the pantry 106 has reduced by ½ cup. Alternatively or in addition, if the data store 116 previously didn't indicate that olive oil was stored in the pantry 106, the user computing device 102 may update the data store 116 so that it reflects that olive oil is stored in the pantry 106.

When POC data corresponds to a user 104 having completed a food item 108, user computing device 102 may update a data store 116 to reflect that the food item 108 has been added to the pantry 106. For example, if POC data reflects that a user 104 has made an apple pie, user computing device 102 may update a data store 116 to indicate that the apple pie has been added to the pantry 106, as well as information about the apple pie, such as nutritional information; quantity; amount remaining; date it was made; an expiration date, etc.

FIG. 6 is a flow diagram of an illustrative process 600 for generating and managing a data store 116 for monitoring food items 108 stored in a smart pantry based on corroborated point of consumption (POC) data for food consumed by an individual. The process 600 may be implemented by the computing architecture 200 and in the environment 100 described above, or in other environments and architectures.

At 602, user computing device 102 receives a selection of a food item 108. User computing device 102 may receive the selection of the food item 108 via a user 104 input, such as a gesture, voice command, a physical interface, a graphical user interface, etc. The food item 108 may correspond to a food item 108 that is stored in a pantry 106 of a user 104, purchased by the user 104, made by the user 104, or otherwise received.

At 604, user computing device 102 identifies the food item 108. For example, based on the user 104 input, user computing device 102 may access a data store 116 that includes food item information associated with the individual food items 108 stored in a pantry 106 of a user 104 (e.g., nutritional information; brand information; food types; flavors; quantities/amounts of individual food items 108 stored in the pantry 106; dates individual food items 108 were purchased; expiration data associated with individual food items 108; etc.), and identify information associated with the food item input by the user 104. In some embodiments, the data store 116 may identify the ingredients, ingredient amounts, nutritional information, etc. of food and drink items that were previously verified as having been made by sensor data from one or more appliances. For example, a user 104 may have previously made an apple pie using an application that verified the ingredients used to make the apple pie, and generated consumption data describing nutritional information specifically for the apple pie. In another embodiment, user computing device 102 may access a locally stored database, a network resource, or similar to obtain information corresponding to the food item 108. For example, user computing device 102 may send a request comprising an identifier for a food item 108 to an internet food service to acquire information associated with the food item 108.

User computing device 102 may cause a graphical interface to be presented on a display that presents a selected food item 108. In some embodiments, a graphical recipe interface may present one or more instructions to guide a user 104. For example, a graphical recipe interface may present an instruction to place a container on an appliance 124 (e.g., a kitchen scale), and then place a portion of the food item 108 on or in the appliance 124.

At 606, appliance 124 receives first sensor information corresponding to a container. In some embodiments, appliance 124 may be a kitchen scale having a sensor configured to detect a mass of the container placed upon the scale. In some embodiments, the container may be a napkin, paper, plastic, etc. In some examples, such as where a user 104 does not use a container (i.e., places the food item 108 directly on the appliance 124), the appliance 124 may not receive the first sensor information.

At 608, appliance 124 receives second sensor information corresponding to a serving of the food item 108 being added to the container. In some embodiments, appliance 124 may be a kitchen scale having a sensor configured to detect a change in mass of the container placed upon the scale when the food or drink corresponding to the selected food item 108 is added to the container. The portion of food item 108 may correspond to a portion that a user 104 is going to consume (e.g., a slice of apple pie), or it may correspond to an amount of the food item 108 that the user 104 is about to consume (e.g., a cup of flour to make a recipe).

At 610, appliance 124 transmits serving information associated with the serving of the food item 108 to user computing device 102. For example, based on first sensor information and second sensor information appliance 124 may determine a mass of a food item 108 added to a scale, and transmit serving information corresponding to the change of mass to user computing device 102. Alternatively, transmitting serving information may correspond to the appliance 124 transmitting all sensor data to the user computing device 102 via a constant stream of sensor data and/or periodic transmissions of sensor data. Serving information may be transmitted from appliance 124 to user computing device 102 via a wired or wireless connection. In some embodiments, where user computing device 102 is integrated into appliance 124, the serving information may be passed between one or more sensors of the appliance and a point of consumption application executing on the user computing device 102 via one or more internal connections.

At 612, user computing device 102 receives serving information from the appliance 124. For example, where appliance 124 is a kitchen scale and a food item 108 is added to a container placed upon the kitchen scale, user computing device 102 may receive serving information corresponding to one or more of a change of mass, an initial mass, a final mass, timing information for a pour event, etc.

At 614, user computing device 102 generates and/or updates a data store 116 to reflect the current state of a pantry 106. The data store 116 may be a database that identifies a collection of food items 108 that are stored in a pantry 106, and/or information associated with the individual food items 108, such as nutritional information; brand information; food types; flavors; quantities/amounts of individual food items 108 stored in the pantry 106; dates individual food items 108 were purchased; expiration data associated with individual food items 108; and/or other information.

In some embodiments, user computing device 102 may generate and/or update a data store 116 based on the serving information. For example, where serving information corresponds to 125 g of apple pie being added, user computing device 102 may update a data store 116 to reflect that the amount of apple pie stored in the pantry 106 has reduced by 125 g or one slice. Alternatively or in addition, if the data store 116 previously didn't indicate that apple pie was stored in the pantry 106, user computing device 102 may update the data store 116 so that it reflects that apple pie is stored in the pantry 106.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An electronic pantry device comprising:
    one or more processing units; and
    memory storing computer-executable instructions executable by the one or more processing units to perform operations comprising;
        receive, from a first appliance, first sensor information associated with a first food item, the first appliance including a computing device and comprising one of an electronic oven, an electronic blender, an electronic mixer, an electronic blender, an electronic refrigerator, or an electronic food thermometer;
        determine, based on the first sensor information, first food item data associated with the first food item;
        generate, based on the first food item data, a data store that indicates that the first food item is stored in a pantry;
        receive, from a second appliance, second sensor information associated with a second food item, the second appliance including a computing device and comprising one of an electronic oven, an electronic blender, an electronic mixer, an electronic refrigerator, or an electronic food thermometer;
        determine, based on the second sensor information, second food item data associated with the second food item;
        update, based on the second food item data, the data store to indicate that the second food item is stored in the pantry,
        the first appliance and the second appliance located external to the pantry.

2. The electronic pantry device as recited in claim 1, wherein the first appliance and the second appliance are the same appliance.

3. The electronic pantry device as recited in claim 1, wherein the first food item data comprises one or more of:
    an identifier for the first food item;
    a name of the first food item;
    a brand of the first food item;
    an expiration date for the first food item; and
    nutrition information for the first food item.

4. The electronic pantry device as recited in claim 1, the operations further comprising:
    receiving, from a third appliance, third sensor information associated with the first food item, the third appliance including a computing device and comprising one of an electronic oven, an electronic blender, an electronic mixer, an electronic refrigerator, an electronic food thermometer;
    determining, based on the third sensor information, that a first quantity of the first food item has been consumed; and
    updating, based on the first quantity, the data store to indicate that a second quantity of the first food item is stored in the pantry, the third appliance located external to the pantry.

5. The electronic pantry device as recited in claim 4, the operations further comprising:
    determining that the second quantity of the first food item is at or below a threshold value; and
    presenting, on a display associated with the electronic pantry device, an option for obtaining the first food item.

6. The electronic pantry device as recited in claim 1, wherein the first sensor information comprises an identifier associated with the first food item, and generating the first food item data comprises transmitting a request comprising the identifier to a food service to acquire one or more portions of the first food item data.

7. A computer-implemented method comprising:
    receiving, by an electronic pantry device from an appliance, sensor information associated with a food item, the appliance including a computing device and comprising one of an electronic oven, an electronic blender, an electronic mixer, an electronic blender, an electronic refrigerator, or an electronic food thermometer;
    determining, by the electronic pantry device and based on the sensor information, food item data associated with the food item; and
    generating, by the electronic pantry device and based on the food item data, a data store that indicates that the food item is stored in a pantry, the appliance located external to the pantry.

8. The computer-implemented method of claim 7, wherein the sensor information is first sensor information, and the method further comprising:
    receiving, by the electronic pantry device from the appliance, second sensor information associated with the food item;
    determining, by the electronic pantry device and based on the second sensor information, that a first quantity of the food item has been consumed; and
    updating, by the electronic pantry device and based on the first quantity, the data store to indicate that a second quantity of the food item is stored in the pantry.

9. The computer-implemented method of claim 8,
    determining, by the electronic pantry device, that the second quantity of the food item is at or below a threshold value; and
    presenting, on a display associated with the electronic pantry device, an option for obtaining the food item.

10. The computer-implemented method of claim 7, wherein the food item data comprises one or more of:
    an identifier for the food item;
    a name of the food item;
    a brand of the food item;
    an expiration date for the food item; and
    nutrition information for the food item.

11. The computer-implemented method of claim 7, wherein the sensor information is indicative of a voice command identifying the food item.

12. A non-transitory computer-readable storage medium having thereon a set of instructions, which if performed by the computer, cause the computer to at least:
   receive, from an appliance, sensor information associated with a food item, the appliance comprising one of an electronic oven, an electronic blender, an electronic mixer, an electronic blender, an electronic refrigerator, or an electronic food thermometer;
   determine, based on the sensor information, food item data associated with the food item; and
   generate, based on the food item data, a data store that indicates that the food item is stored in a pantry, the appliance located external to the pantry.

13. The non-transitory computer-readable storage medium as recited in claim 12, wherein the sensor information associated with the food item is first sensor information associated with a first food item, and the set of instructions further cause the computer to:
   receive, from the appliance, second sensor information associated with a second food item;
   determine, based on the second sensor information, additional food item data associated with the second food item; and
   update, based on the additional food item data, the data store to indicate that the food item and the second food item are stored in the pantry.

14. The non-transitory computer-readable storage medium as recited in claim 12, wherein the sensor information is first sensor information, and the set of instructions further cause the computer to:
   receive, from the appliance, second sensor information associated with the food item;
   determining, based on the second sensor information, that a first quantity of the food item has been consumed; and
   updating, based on the first quantity, the data store to indicate that a second quantity of the food item is stored in the pantry.

15. The non-transitory computer-readable storage medium as recited in claim 12, wherein the set of instructions further cause the computer to present, on a display associated with the computer and based on the data store, a recommendation of a recipe that includes the food item.

16. The non-transitory computer-readable storage medium as recited in claim 12, wherein the set of instructions further cause the computer to:
   determine, based on the data store, that the food item is nearing expiration; and
   present, on a display associated with the computer and based on the food item being near expiration, a recommendation of a recipe that includes the food item.

* * * * *